Figure 1:
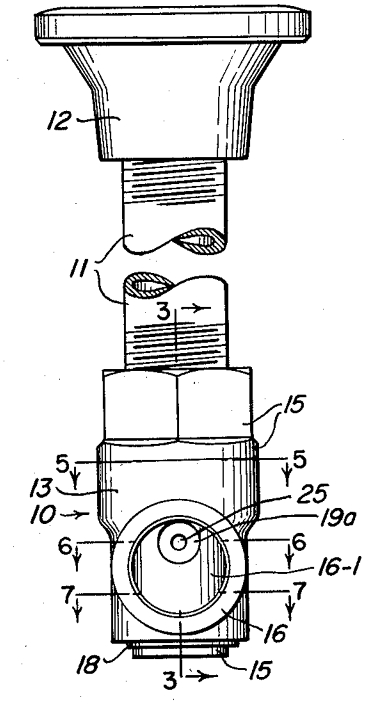

DRAIN VALVE ASSEMBLY FOR LAWN SPRINKLER SYSTEMS

Filed Oct. 8, 1956

INVENTOR:
NORMAN L. VAN WAGENEN,
ARA NORMAN LAMPH,
BY J. H. Mallinckrodt
and Philip A. Mallinckrodt
ATTORNEYS.

United States Patent Office 2,905,196

Patented Sept. 22, 1959

1

2,905,196

DRAIN VALVE ASSEMBLY FOR LAWN SPRINKLER SYSTEMS

Norman L. Van Wagenen, Salt Lake City, and Ara Norman Lamph, Bountiful, Utah

Application October 8, 1956, Serial No. 614,508

3 Claims. (Cl. 137—625.2)

This invention relates to component parts of lawn sprinkler systems, and particularly to drain valve assemblies therefor.

It is customary to provide drain valves in lawn sprinkler systems, especially in climates where a winter season requires drainage to prevent freezing. Ordinary practice in this respect involves the incorporation of a drain pet cock of one type or another at one or more low points of the system, usually at the terminus of each branch line. Such drain pet cocks are invariably located below ground, necessitating the provision of access holes leading downwardly thereto from the surface for accommodating a manipulating rod at such times as it is desired to drain the system or to place it in condition for use after the winter season is over. Such holes are not only unsightly, but very often become filled with debris which must be removed before the holes can be used.

It is the purpose of the present invention to provide a drain valve and sprinkler assembly that entirely eliminates the need for access holes and use of a manipulative rod, and that makes possible a most convenient closing and opening of the drain by merely turning the sprinkler head at the surface in one direction or the other.

In accomplishing our purpose, we provide a unique valve in combination with a sprinkler riser and head. Connected to the terminus of any branch sprinkler line or other drainage terminal of a lawn sprinkler system, such combination enables drainage to be effected quickly and easily by merely turning the riser. The sprinkler head ordinarily serves as a convenient handle for the purpose.

Further objects and features of the invention will become apparent from the following detailed description of the preferred specific embodiment illustrated in the accompanying drawing.

Figure 2:
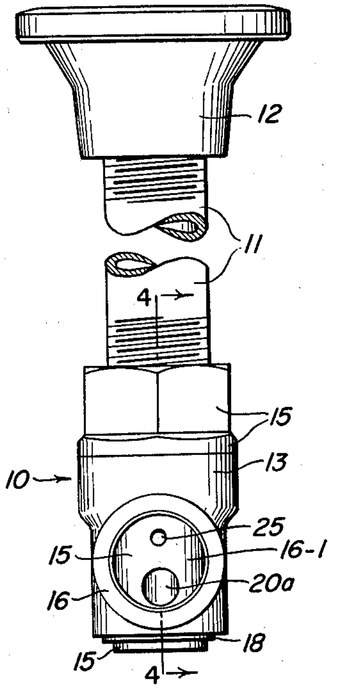
Figure 3:
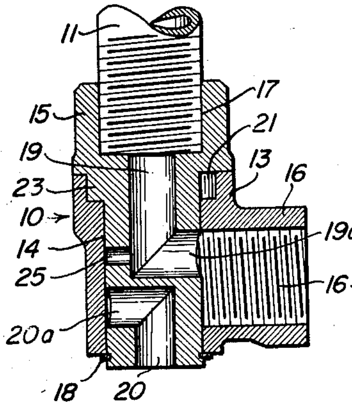
Figure 4:
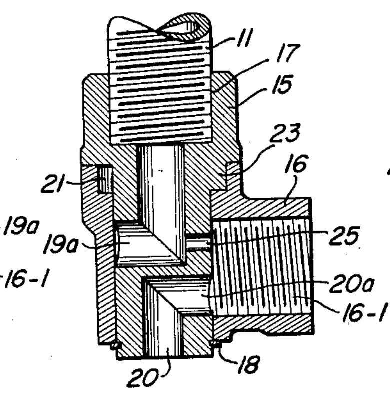
Figure 5:
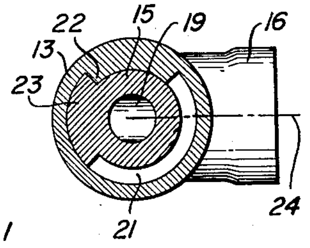
Figure 6:
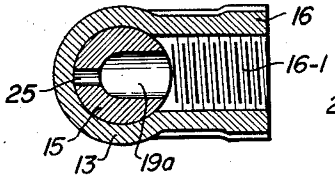

In the drawing:

Fig. 1 represents an elevation of the valve, sprinkler riser, and sprinkler head combination, looking toward the open end of the valve lateral which affords connection with the terminus of a branch line of a lawn sprinkler system, the valve being shown in sprinkling position and intermediate portions of the riser being broken out for convenience of illustration;

Fig. 2, a view corresponding to that of Fig. 1, but taken after the sprinkler head and riser have been turned through 90° to turn the valve into drainage position;

Fig. 3, a fragmentary vertical section taken on the line 3—3 of Fig. 1;

Fig. 4, a corresponding view taken on the line 4—4 of Fig. 2;

Fig. 5, a horizontal section taken on the line 5—5 of Fig. 1;

Fig. 6, a horizontal section taken on the line 6—6 of Fig. 1; and

Figure 7:
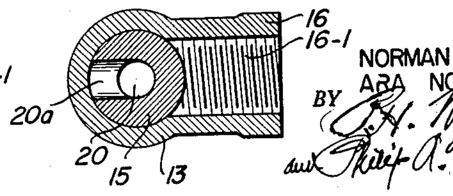

Fig. 7, a horizontal section taken on the line 7—7 of Fig. 1.

Referring now to the drawing:

The invention is here illustrated in connection with a "Thompson" type of sprinkler head, but it is to be understood that other sprinkler heads may be used with equal effect so far as the purposes of the invention are concerned.

2

The inventive combination includes a drain valve 10, a riser pipe 11, and a sprinkler head 12.

As here illustrated, the drain valve 10 comprises a valve body 13, having a receiving passage 14 extending completely therethrough for rotatably mounting a ported movable valve member 15, and having an internally threaded, fluid flow lateral 16 whose flow passage 16–1 intersects the receiving passage 14 and is adapted for connection with a supply pipe (not shown), usually the low terminus of a lawn sprinkler line.

Movable valve member 15 is rotatably fitted into receiving passage 14 of valve body 13, so as to extend across and control flow through lateral 16. Its upper end is recessed and internally threaded at 17 to permit the lower end of riser 11 to be screwed thereinto, as illustrated. A spring retainer clip 18 rotatably secures such valve member in position within the valve body.

Valve member 15 is provided with alternative flow passages therethrough having respective ports affording control of fluid flow as between supply and drainage positions. In the form illustrated, two oppositely directed, right-angled or elbow flow passages 19 and 20 are provided in the upper and lower portions, respectively, of such movable valve member 15, to provide flow communication between lateral 16 and sprinkler riser 11, in one position of the valve, Fig. 3, and to provide flow communication between such lateral 16 and the ground in an opposite position of such valve, Fig. 4.

The lateral branch **20*a* of flow passage 20 preferably communicates with the lowest point of lateral 16**, so as to effectively drain the entire pipe line connected therewith.

For establishing proper registry of the passages 19 and 20 with the lateral 16 in the alternative positions of the valve, limit stop means are provided between valve body 13 and movable valve member 15. In the form illustrated, valve body 13 has its upper end counter-recessed at 21, except for an arcuate segment 22 of predetermined length and position. Movable valve member 15 is provided with an arcuate shoulder 23 of formation similar to that of the segment 22, so as to fit and rotate within the counter-recess 21 of valve body 13.

Shoulder 23 abuts against segment 22 in both directions of rotation of the valve member relative to the valve body, abutting against one end thereof in one direction and against the opposite end in the other direction. The combined arcuate length of shoulder and segment is advantageously ninety angular degrees, and segment 22 is, under such circumstances, positioned midway between a semicircular portion of the valve body taken from the axis 24 of lateral 16, see Fig. 5.

A bleeder passage 25 is provided as a rearward extension of the lateral branch **19*a* of passage 19, so as to provide for draining the sprinkler riser 11, as well as any supply line connected to lateral 16**, in the drain position of the valve.

Whereas this invention is here illustrated and described with respect to a specific embodiment thereof, it should be realized that changes may be made within the scope of the following claims, without departing from the essential contributions to the art made by the teachings hereof.

We claim:

1. A drain valve, comprising a valve body having a receiving passage extending therethrough from end to end thereof, and having a lateral member with a flow passage therethrough intersecting said receiving passage, said lateral member being adapted for connection to piping; and a movable valve member snugly fitted in said receiving passage of the valve body for rotation relative to the latter, said valve member having oppositely directed flow passages formed within respective end portions thereof and extending, respectively, from a location at one side thereof, adapted for communication with said lateral member, to one of said ends of the valve member, and from a similar location at another side thereof to the opposite end of said valve member, and having a bleeder passage extending laterally therethrough as a continuation of one of said oppositely directed flow passages and opening adjacent the opening of the other of said flow passages so as to be comprehended in common therewith by said flow passage of the lateral member, that end of said movable valve member to which said one flow passage extends being recessed and internally threaded for the reception of piping.

2. The drain valve assembly of claim 1, wherein there are also provided mutually engaging abutment means on the valve body and the movable valve member, respectively, for establishing proper alternative registry of the former of the oppositely directed flow passages and of the latter of said flow passages along with the bleeder passage, respectively.

3. The drain valve assembly of claim 2, wherein the mutually engaging abutment means comprise respective members of arcuate segmental formation disposed within circular interengaging formations of the valve body and the movable valve member, respectively.

References Cited in the file of this patent

UNITED STATES PATENTS

| | | |
|---|---|---|
| 1,342,051 | Lapenda | June 1, 1920 |
| 1,350,138 | Clauss | Aug. 17, 1920 |
| 1,428,553 | Oakes | Sept. 12, 1922 |
| 1,462,256 | Barney | July 17, 1923 |
| 1,675,992 | Sherman | July 3, 1928 |
| 1,815,395 | Buckner | July 21, 1931 |